US006825763B2

(12) United States Patent
Ulrich et al.

(10) Patent No.: US 6,825,763 B2
(45) Date of Patent: Nov. 30, 2004

(54) PERSONNEL AND ASSET TRACKING METHOD AND APPARATUS

(75) Inventors: Daniel J. Ulrich, Hamilton, OH (US); Michael Edward Wagener, Arlington Heights, IL (US); Sanjeev Patel, Chicago, IL (US); Joseph James Schmid, Gurnee, IL (US); Robert J. Jennings, Annandale, VA (US)

(73) Assignee: Hill-Rom Services, Inc., Wilmington, DE (US)

( * ) Notice: Subject to any disclaimer, the term of this patent is extended or adjusted under 35 U.S.C. 154(b) by 0 days.

(21) Appl. No.: 10/265,781

(22) Filed: Oct. 7, 2002

(65) Prior Publication Data

US 2003/0030569 A1 Feb. 13, 2003

Related U.S. Application Data

(63) Continuation of application No. 09/751,241, filed on Dec. 29, 2000, now Pat. No. 6,462,656, which is a continuation of application No. 09/479,359, filed on Jan. 7, 2000, now Pat. No. 6,344,794, which is a continuation of application No. 08/963,396, filed on Nov. 3, 1997, now abandoned.

(51) Int. Cl.[7] .................................................. G08B 1/08
(52) U.S. Cl. .............................. 340/539.1; 340/539.11; 340/539.13; 340/573.1; 340/573.4; 340/825.36; 340/825.49
(58) Field of Search .................... 340/539.1, 539.11, 340/539.12, 539.13, 539.15, 573.1, 825.36, 825.49, 573.4

(56) References Cited

U.S. PATENT DOCUMENTS

| 3,439,320 A | 4/1969 | Ward |
| 3,739,329 A | 6/1973 | Lester |
| 4,151,407 A | 4/1979 | McBride |

(List continued on next page.)

FOREIGN PATENT DOCUMENTS

| GB | 2 193 359 | 2/1988 |
| GB | 2 230 365 | 10/1990 |
| GB | 2 265 038 | 9/1993 |

OTHER PUBLICATIONS

"Great New Product: Infrared Locator," Teleconnect, Feb., 1986.

T.H. Ooi, "Low Cost RF Identification and Locating System," IEEE Trans. On Consumer Electronics, vol. 35 No. 4, Nov. 1989, pp. 831–839.

United Identifications Systems Corp., Infra–Com, 1989.

Primary Examiner—Daryl Pope
(74) Attorney, Agent, or Firm—Bose McKinney & Evans LLP

(57) ABSTRACT

A system is provided for locating and tracking tags within an area. Each tag includes a transmitter configured to transmit a unique identifier periodically. Location messages are received and processed by at least one monitoring system to determine whether a tag has changed location.

35 Claims, 13 Drawing Sheets

U.S. PATENT DOCUMENTS

| | | | |
|---|---|---|---|
| 4,216,462 A | * 8/1980 | McGrath et al. | 600/301 |
| 4,225,953 A | * 9/1980 | Simon et al. | 367/117 |
| 4,275,385 A | * 6/1981 | White | 340/825.49 |
| 4,601,064 A | * 7/1986 | Shipley | 398/127 |
| 4,649,385 A | * 3/1987 | Aires et al. | 379/56.3 |
| 4,837,568 A | * 6/1989 | Snaper | 340/10.52 |
| 4,967,195 A | * 10/1990 | Shipley | 340/825.52 |
| 4,990,892 A | * 2/1991 | Guest et al. | 340/573.4 |
| 5,027,314 A | * 6/1991 | Linwood et al. | 701/300 |
| 5,051,741 A | * 9/1991 | Wesby | 340/825.49 |
| 5,062,151 A | * 10/1991 | Shipley | 398/108 |
| 5,119,104 A | * 6/1992 | Heller | 342/450 |
| 5,153,584 A | * 10/1992 | Engira | 340/870.18 |
| 5,218,344 A | 6/1993 | Ricketts | |
| 5,291,399 A | 3/1994 | Chaco | |
| 5,317,309 A | 5/1994 | Vercellotti et al. | |
| 5,319,363 A | 6/1994 | Welch et al. | |
| 5,363,425 A | 11/1994 | Mufti et al. | |
| 5,387,993 A | 2/1995 | Heller et al. | |
| 5,390,238 A | 2/1995 | Kirk et al. | |
| 5,396,224 A | 3/1995 | Dukes et al. | |
| 5,402,469 A | 3/1995 | Hopper et al. | |
| 5,417,222 A | 5/1995 | Dempsey et al. | |
| 5,426,425 A | 6/1995 | Conrad et al. | |
| RE35,035 E | 9/1995 | Shipley | |
| 5,455,851 A | 10/1995 | Chaco et al. | |
| 5,458,123 A | 10/1995 | Unger | |
| 5,465,082 A | 11/1995 | Chaco | |
| 5,471,404 A | 11/1995 | Mazer | |
| 5,493,283 A | 2/1996 | Hopper et al. | |
| 5,515,426 A | 5/1996 | Yacenda et al. | |
| 5,534,876 A | 7/1996 | Erickson et al. | |
| 5,541,585 A | 7/1996 | Duhame et al. | |
| 5,548,637 A | 8/1996 | Heller et al. | |
| 5,561,412 A | 10/1996 | Novak et al. | |
| 5,572,195 A | 11/1996 | Heller et al. | |
| 5,576,952 A | 11/1996 | Stutman et al. | |
| 5,588,009 A | 12/1996 | Will | |
| 5,594,786 A | 1/1997 | Chaco et al. | |
| 5,627,524 A | 5/1997 | Fredrickson et al. | |
| 5,633,742 A | 5/1997 | Shipley | |
| 5,689,229 A | 11/1997 | Chaco et al. | |
| 5,742,233 A | 4/1998 | Hoffman et al. | |
| 6,462,656 B2 | * 10/2002 | Ulrich et al. | 340/539.1 |

* cited by examiner

PERSONNEL AND ASSET TRACKING METHOD AND APPARATUS

RELATED APPLICATIONS

This is a continuation of application Ser. No. 09/751,241 filed on Dec. 29, 2000, now U.S. Pat. No. 6,462,656, which is a continuation of application Ser. No. 09/479,359 filed on Jan. 7, 2000, now U.S. Pat. No. 6,344,794, which is a continuation of application Ser. No. 08/963,396 filed on Nov. 3, 1997, now abandoned, all of which are incorporated herein by reference.

TECHNICAL FIELD OF THE INVENTION

This invention relates to a system for tracking personnel and assets over an extended area composed of one or more sub-areas which are monitored by sub-area monitoring systems. The sub-area monitoring systems communicate with and update location databases resident on a common central server. Clients communicate with and access the databases of the central server via an Internet web browser interface.

BACKGROUND OF THE INVENTION

Location and tracking systems using object tags, a plurality of receivers located at known locations and a central computer are well known in the art. The tags periodically transmit a unique ID signal which is received by the receivers and the central processor combines the receiver location with the tag ID to determine the location of the object associated with the tag. However, these systems have several limitations. Location data maintained by the central processor has limited accessibility from locations other than the central processor. All location data is maintained by the central processor. Any location monitoring devices that send location data to the central processor must be specifically designed to work with the central processor, and must be like all the other location monitoring devices connected to the central processor. All of the location data must be sent to the central processor and anytime communication with the central processor is lost the location data collected by the disconnected location monitoring devices is inaccessible. The central processor receives location updates but does not forward location data to other monitoring systems.

SUMMARY OF THE INVENTION

An illustrated embodiment of the present invention includes a central location database that can be accessed from any computer with network access to the central server through Intranet or Internet using a standard web browser interface. The web browser interface is illustratively created using a Microsoft technology called Active Server Pages and the programming language VBScript. Active Server Pages allow the creation of dynamic web pages which are tailored according to the requests of the client queries. The dynamic server pages are interpreted by the web browser to provide virtually complete access to the location databases and other databases maintained on the central server. Any computer with communications network access to the central server and supporting a web browser interface can access the location data and other data stored on the central server.

The illustrated embodiment of the present invention allows the tracking and locating of objects over a large area by combining the object transmissions received over multiple sub-areas which are monitored by autonomous monitoring systems interconnected through a communications network. Each location monitoring system sends the location updates to the central server over the communications network. The central server can maintain location data for a large area by receiving location updates over several sub-areas which each have a location monitoring system tracking object tags in their particular sub-area. The area and sub-areas could be a building and its floors, a campus and its buildings, or several campuses and the floors of each of the buildings on each of the campuses. The sub-area monitoring systems only have to be able to track the same tags and have access to the central server over a communications network for a client connected to the central server to obtain location information on an object anywhere in the awareness area.

The illustrated embodiment of the present invention supports locating and tracking over the entire area using both dependent locating and tracking system, locating and tracking systems which depend upon the central database to store location data and to respond to database queries, and independent locating and tracking systems, locating and tracking systems which forward location data to the central server as well as maintaining local sub-area location databases. Each of the sub-area monitoring systems can either send all data to the central server for recording, a dependent monitoring system, or have a local database for objects assigned to the local sub-area and also send location updates to the central server, an independent monitoring system. If either monitoring system loses communication with the central server it will store location updates to transmit when communication is restored. An independent monitoring system will continue to support local location queries for the objects assigned to its sub-area when communication is lost with the central server. The central server can also pass location updates and messages back to the independent monitoring systems. If an object assigned to sub-area A is in another sub-area monitored by the central server then location updates can be recorded at the central server and forwarded to sub-area A to keep the local database updated even when the objects are outside sub-area A. The independent monitoring system can also assign new tags to the sub-area and receive updates from anywhere monitored by the central server. However, when communication with the central server is lost only objects within the sub-area can be tracked.

Additional advantages and features of the invention are set forth in the description that follows, and will become apparent to those skilled in the art upon reviewing the drawings in connection with the following description.

DETAILED DESCRIPTION OF THE DRAWINGS

Figure 1:
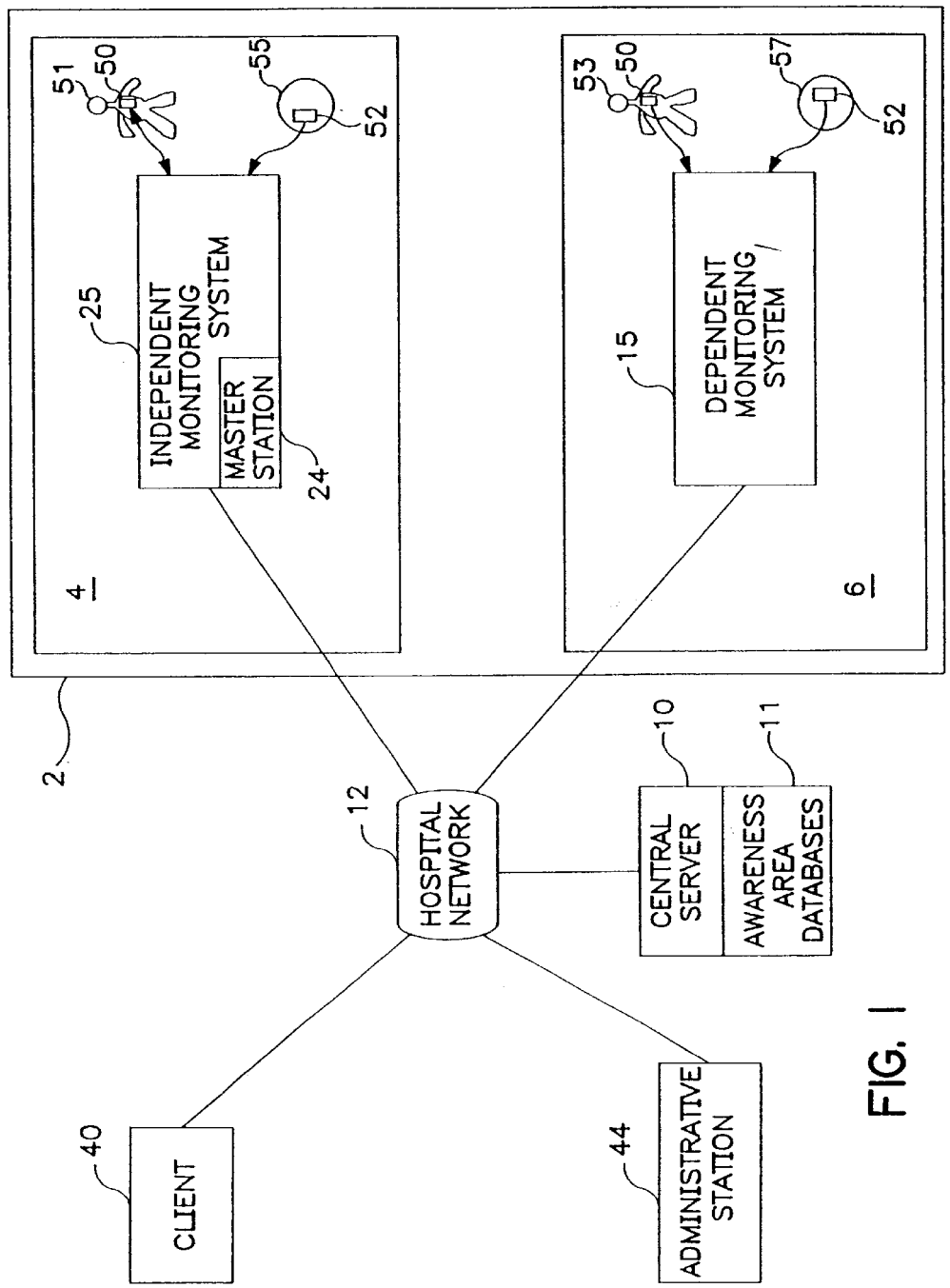
FIG. 1 is a block diagram of the layout of the personnel and asset tracking system.

FIG. 1 illustrates the interconnection of the primary components of the personnel and asset tracking system. The heart of the system is the central server 10 which maintains the awareness area databases 11 for the system over the entire area in which awareness of personnel and assets is to be monitored, the awareness area 2. The central server 10 receives location and status updates from at least one monitoring system through a communications network 12. Each monitoring system monitors personnel and assets throughout a sub-area of the awareness area, a sub-awareness area. FIG. 1 shows an independent monitoring system 25 monitoring a sub-awareness area 4 and a dependent monitoring system 15 monitoring another sub-awareness area 6. Both the dependent monitoring system 15 and the independent monitoring system 25 send location updates to the central server 10 over the network 12. The dependent monitoring system 15 does not maintain a local database, and thus depends on the central server 10 to handle location queries from clients 40. The independent monitoring system 25 maintains a local sub-awareness area 4 location database on the master station 24, and thus can support local queries for objects assigned to it independent of the central server 10. The independent monitoring system 25 receives signals transmitted by a personnel badge 50 worn by a person 51 and an asset tag 52 attached to an asset 55. The dependent monitoring system 15 receives signals transmitted by another personnel badge 50 worn by a person 53 and another asset tag 52 attached to an asset 57. An awareness area 2 and sub-awareness areas 4, 6 could be a building and its floors or a campus and its buildings. Each entity to be monitored in the awareness area 2 wears a personnel badge 50 or an asset tag 52 which transmits a unique object ID signal.

Access to the awareness area databases 11 maintained at the central server 10 can be gained from a client 40 or an administrative station 44 through the network 12. Client 40 can be connected to the network 12 locally (e.g. Intranet) or remotely (e.g. Internet). Independent monitoring system 25 can also access the awareness area databases 11 maintained on the central server 10 through the hospital network 12.

Figure 2:
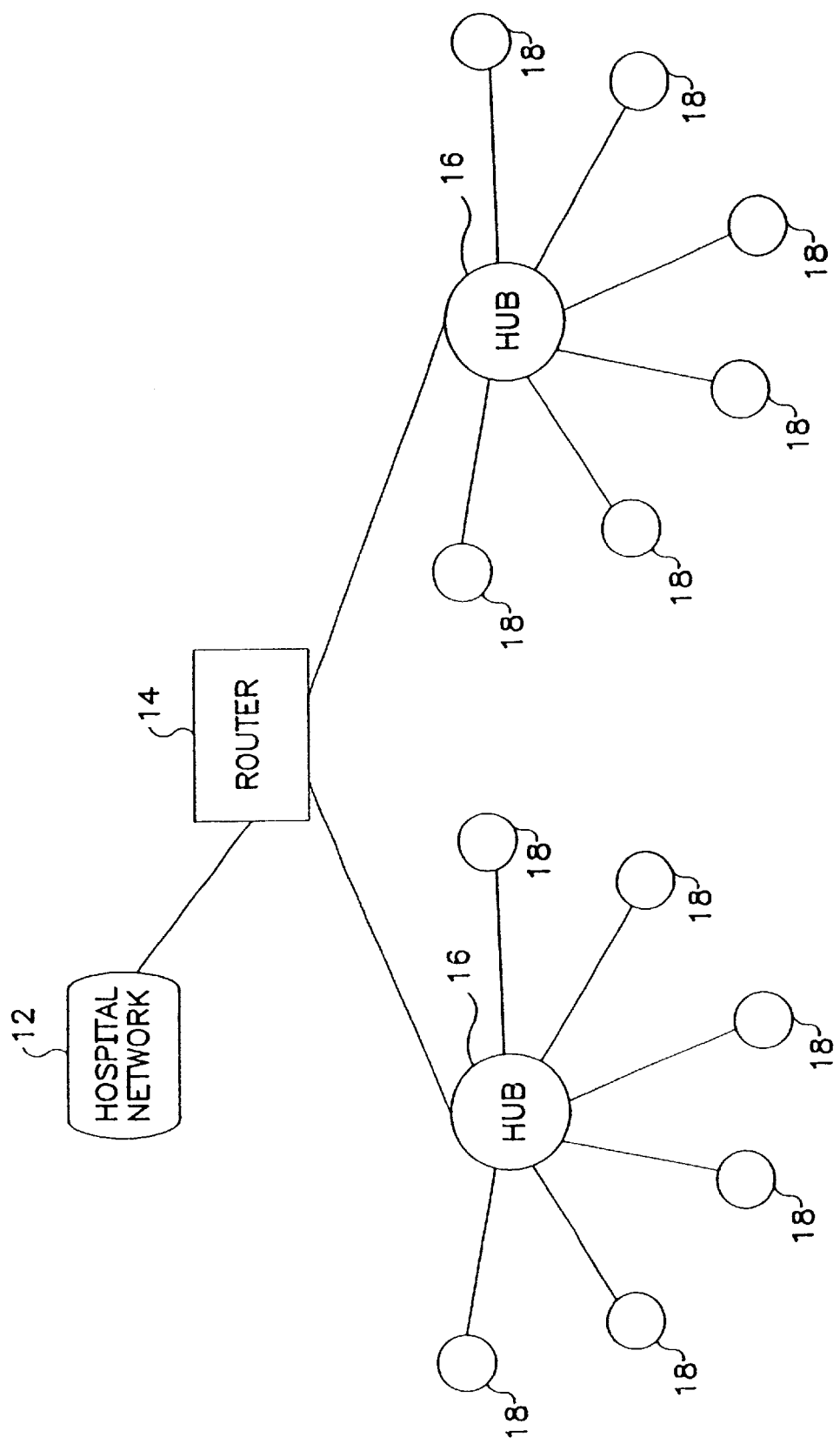
FIG. 2 shows the interconnection of the components of a dependent monitoring system.

There are two types of sub-awareness area monitoring systems. A dependent monitoring system 15 is connected to the hospital network 12 through a router 14 as shown in FIG. 2. A dependent monitoring system 15 does not maintain sub-awareness area databases or support sub-awareness area queries but rather forwards all information to the central server 10. A dependent monitoring system 15 is comprised of a router 14, at least one hub 16 and a plurality of nodes 18. Each node 18 continuously monitors a particular area in the sub-awareness area for personnel badge 50 and asset tag 52 transmissions. Each node 18 communicates with and sends location messages to a hub 16. The hub 16 communicates with and sends location messages to the router 14. The router 14 communicates with and sends location messages to the central server 10 over the hospital network 12.

The second type of sub-awareness area monitoring system is an independent monitoring system 25 as disclosed in U.S. Pat. No. 5,561,412 which is hereby incorporated by reference. An independent monitoring system 25 has a set of personnel badges 50 assigned for which it maintains a local database on its master station 24 which also supports local queries and status messages. The master station 24 communicates with the central server 10 over the hospital network 12.

Figure 3:
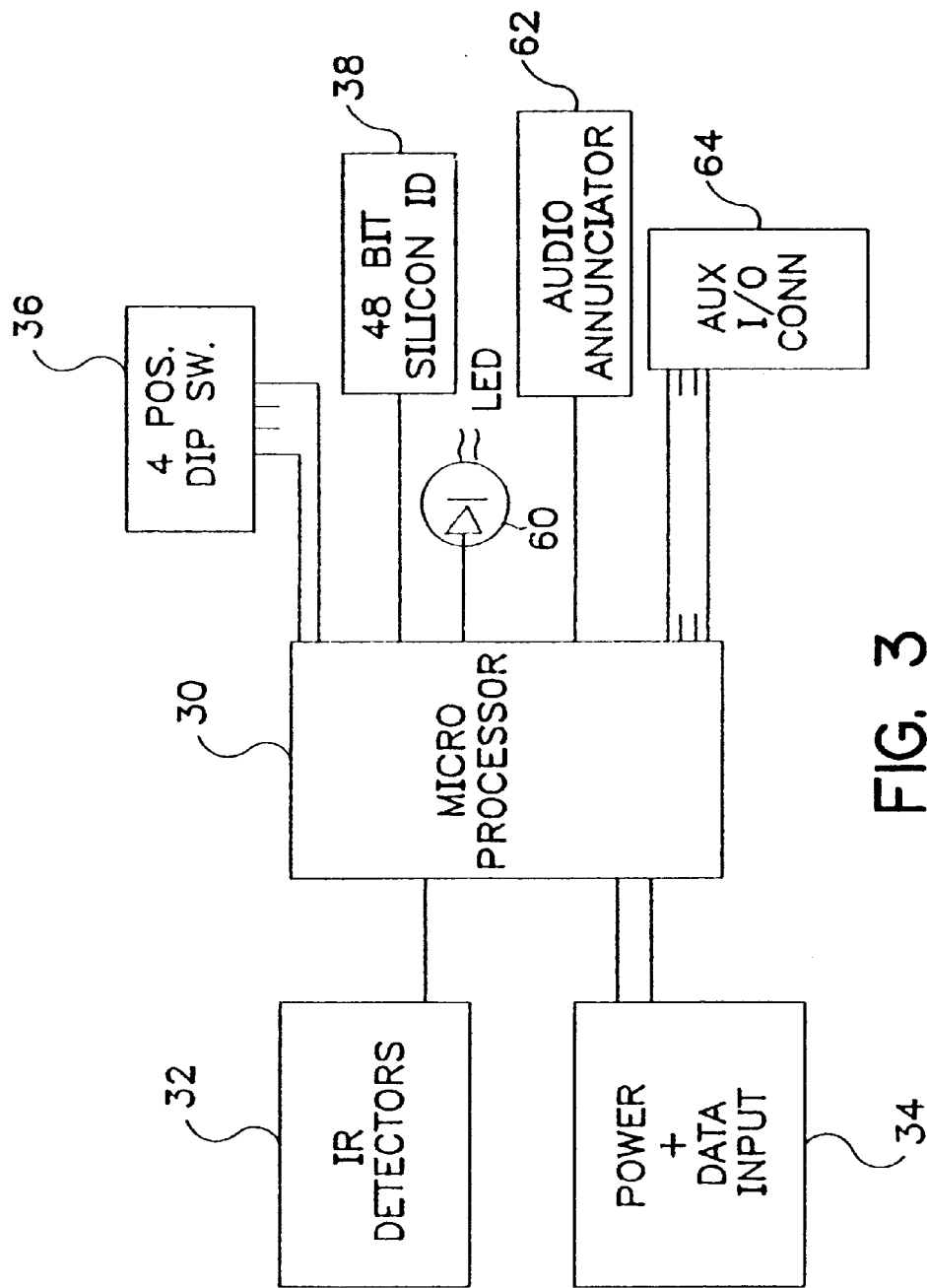
FIG. 3 shows the interconnection of the components of a receiver node.

In either type of monitoring system the process is triggered by the reception of a personnel badge 50 or asset tag 52 transmission at a receiver node 18. The receiver node 18 generates a presence or entry message which is sent to a downstream location processor. A detailed diagram of the receiver node 18 is shown in FIG. 3. The receiver 18 includes a microprocessor 30. The receiver 18 of a dependent monitoring system 15 receives power and data inputs 34 from the hub 16. The dip switches 36 are used to configure the receiver 18 for use with either a dependent monitoring system 15 or an independent monitoring system 25. The multiple infrared detectors 32 receive the transmissions of personnel badges 50 and asset tags 52 and relay them to the microprocessor 30, which processes the badge transmissions and can forward a location message to the next upstream location processor over the data lines 34. The 48 bit silicon ID is set to a unique address to identify the node 18. The node 18 also has a LED 60, an audio annunciator 62 and a auxiliary I/O connector 64.

Figure 4:
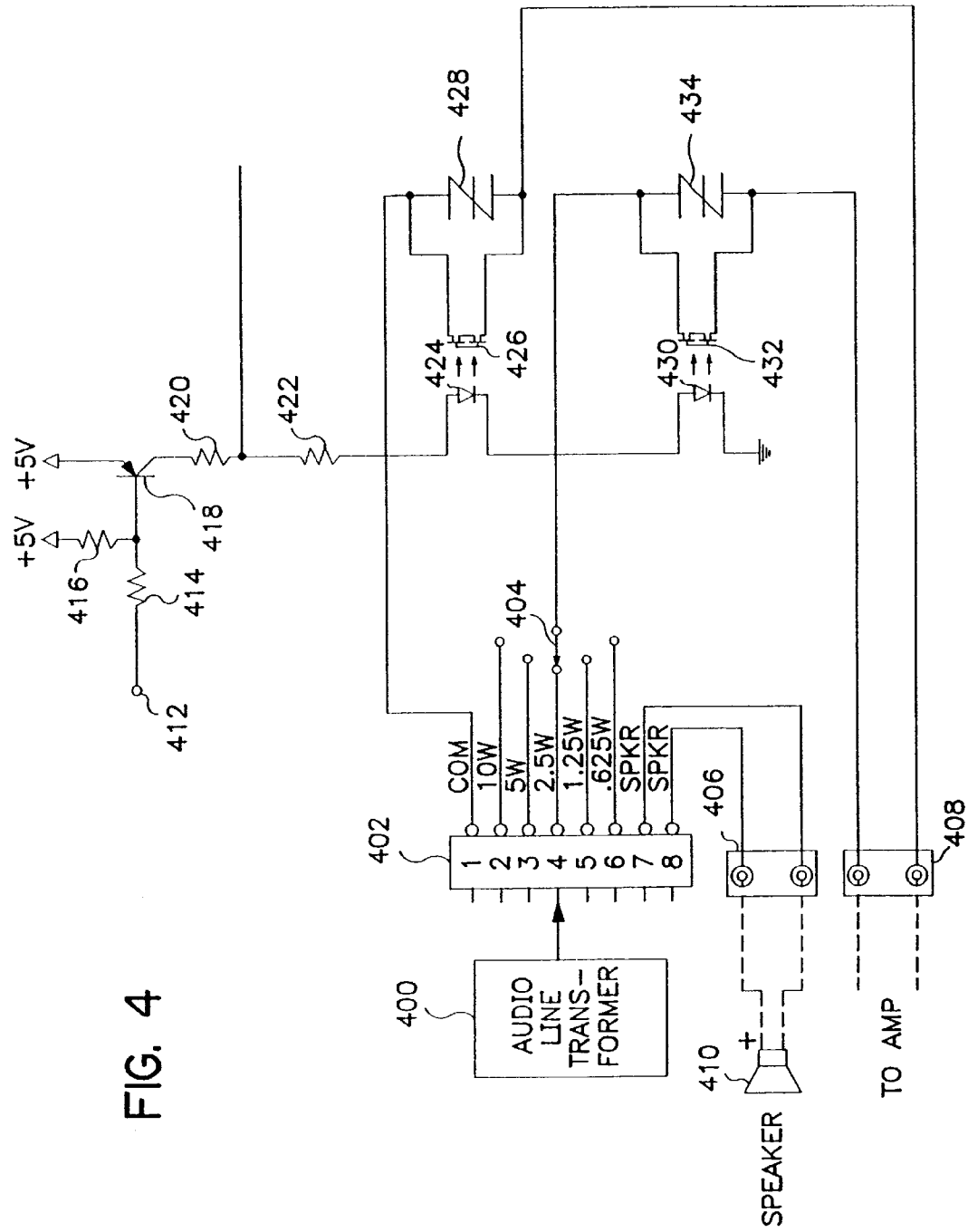
FIG. 4 is a detailed design of the receiver node audio annunciator.

A detailed drawing of the audio annunciator 62 is shown in FIG. 4. If the audio annunciator 62 of the node 18 is selected then a control signal will be sent by the microprocessor 30 at the connection 412 through the resistor 414. A resistor 416 ties the base of the transistor 418 to the voltage source. The control signal from the transistor 418 passes through resistors 422 and 420 to activate the audio switches 424, 430 and the audio line transformer 400. The audio signal is input from an audio amplifier over connector 408. The audio input is processed simultaneously by two parallel and totally isolated audio switches. The audio signal passes across a pair of optically isolated FET switches 424, 430 which transmit an optical signal to the photo-transistors 426, 432 which are each in parallel with a noise suppression diode 428, 434. The output audio signal is input to the audio line transformer 400 through connector 402. The output of the audio line transformer 400 is sent through connectors 402 and 406 to speaker 410. Switch 404 controls the volume of the signal sent to speaker 406.

Figure 5:
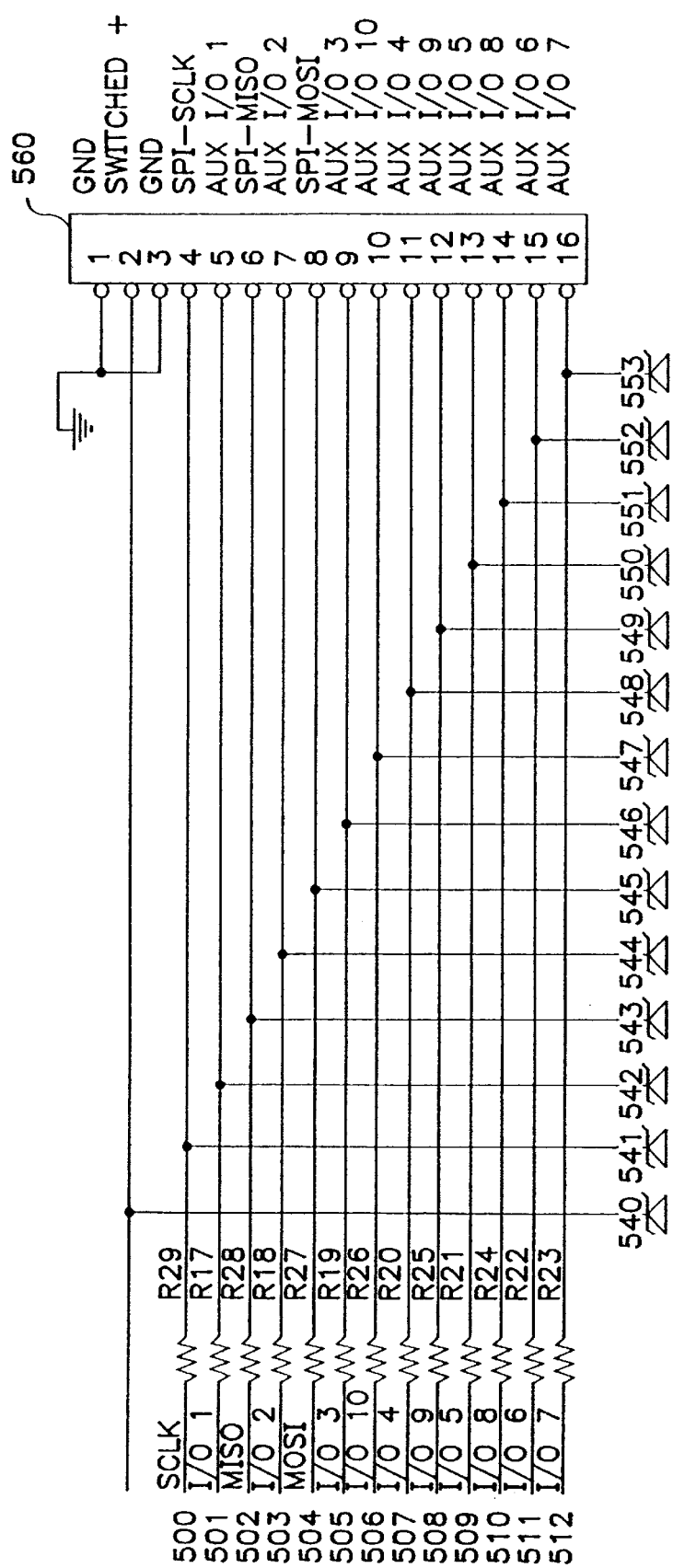
FIG. 5 is a detailed design of the receiver node auxiliary I/O connector.

A detailed diagram of the auxiliary I/O connector 64 of the node 18 is shown in FIG. 5. The auxiliary I/O connector 64 is connected to the microprocessor 30 through the lines 500–512. Each line to the microprocessor 30 is protected by a current limiting resistor 517–529 and a zener diode clamp 540–553 to protect from reverse or over-voltages. Each line is also connected to a input/output line at connector 560. These auxilary lines could be used for inputs or outputs. Examples of inputs are monitoring room temperatures or the presence of persons without a personnel badge or for outputs. Examples of outputs are thermostat controls, light controls or buzzers.

Inter-Location Messages

Both a dependent monitoring system 15 and an independent monitoring system 25 is comprised of an infrastructure with multiple location processor levels. The most upstream location processors are the nodes 18 which receive the badge/tag transmissions and pass them downstream and generate the initial location messages. These location messages are passed downstream to intermediate location processors which pass the location messages to the downstream location processors which are either a router 14 or a master station 24 that passes the location message to the central server 10. A location message begins with the reception of an object ID from a personnel badge 50 or asset tag 52 transmission and ultimately ends with the updating of a database 11 such that the best location data is available for all objects being tracked. A location processor can function in either a pass-through or a buffered mode. In pass-through mode any location message received by the location processor is passed to the next location processor in the stream leading to the central server 10. In buffered mode the location processor maintains a cache with a stack for each object ID it is currently tracking and only passes along changes in the status of a particular object ID. The inter-location messages in buffered mode can be either presence messages, entry messages or exit messages, while the inter-location messages in pass-through mode are presence messages. Each of these messages is for a particular personnel badge 50 or asset tag 52 object ID at a particular awareness area location. Entry and exit messages also have a time stamp associated with them identifying the time the event occurred.

Figure 6:
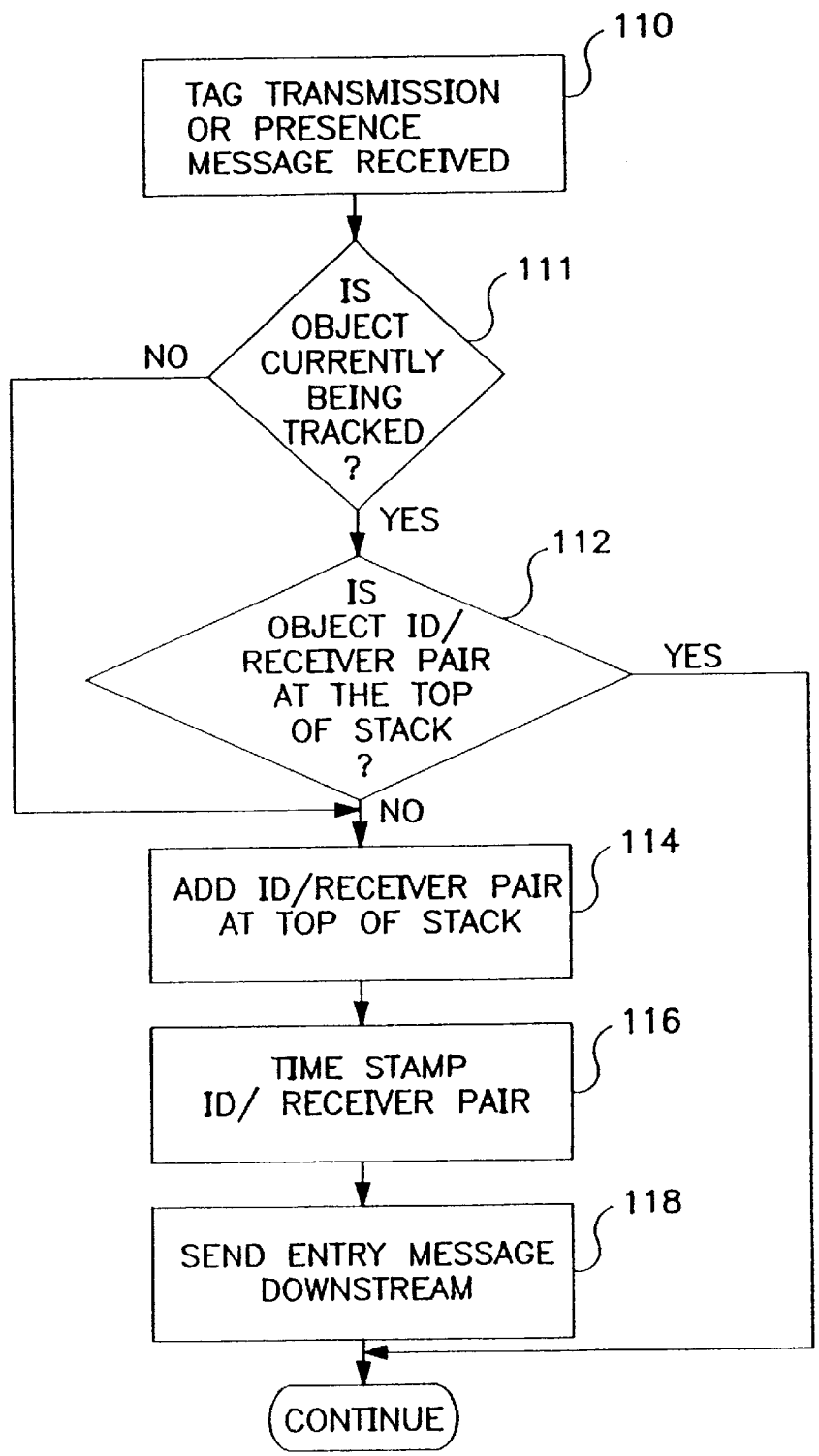
FIG. 6 shows the procedure used by a location processor for processing a presence message.

A presence message simply indicates that a particular object ID is present at a particular awareness area location. A presence message is generated at a node 18 when it receives a personnel badge 50 or asset tag 52 transmission or is received at a downstream location processor from an upstream pass-through location processor. The processing of a presence message by the first buffered location processor is shown in FIG. 6. The process is initiated by the reception of a tag transmission at a node 18 or the reception of a presence message from an upstream location processor 110. The location processor receiving the presence message checks if it is currently tracking this object ID 111. If the object ID is currently being tracked, the location processor checks if the top entry in the stack for this object ID already shows the same location as the presence message 112. If the top entry of the stack already contains this object ID and receiver pair then there is no change in the object's location and no further processing is required. If its cache does not contain this object ID or it shows a different location then there has been a location change for this object. The location processor adds the object ID and receiver pair to the top of the stack for the object ID in its cache 114, time stamps the message 116, and sends an entry message to the next downstream location processor 118.

Figure 7:
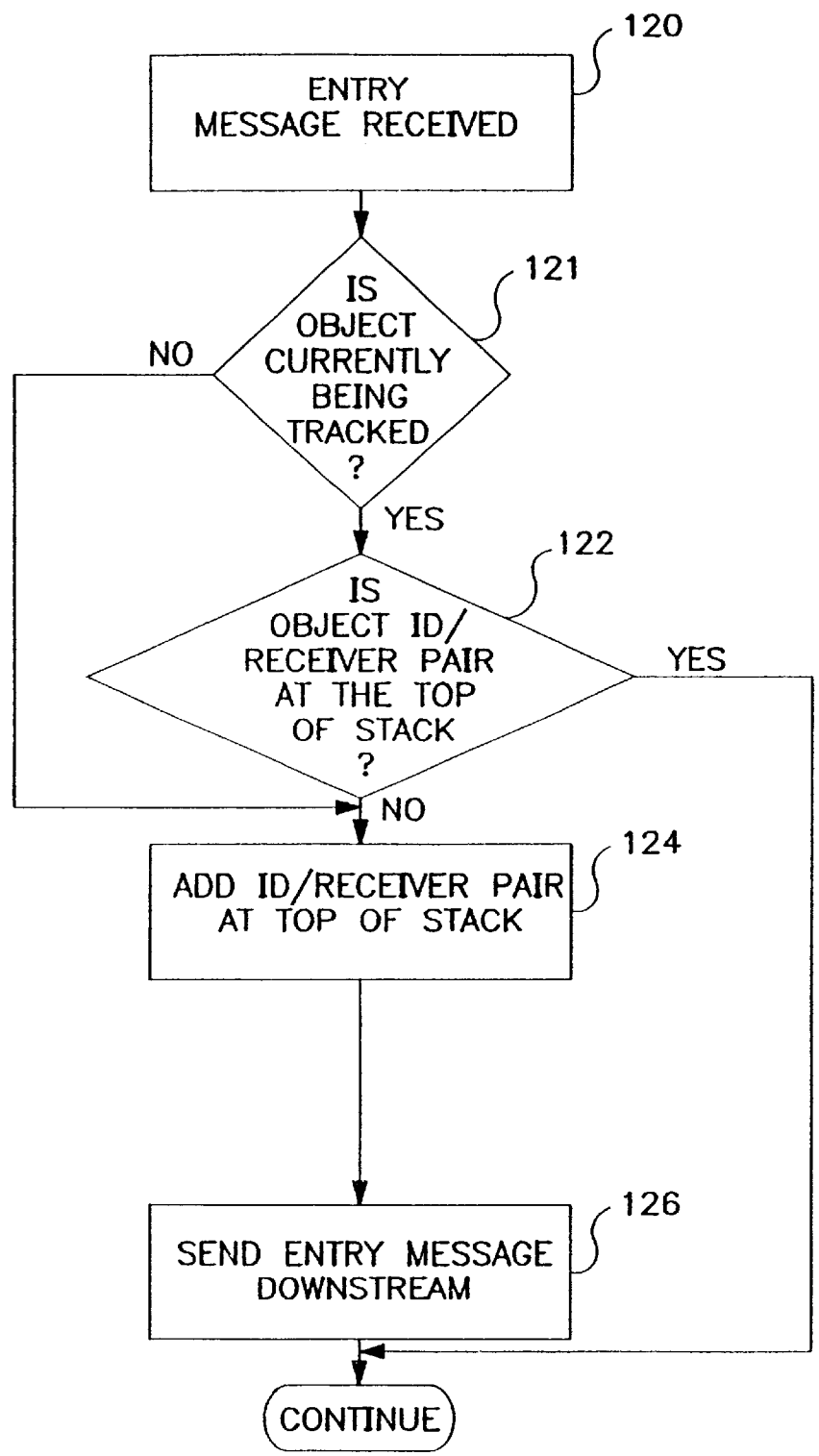
FIG. 7 shows the procedure used by a location processor for processing an entry message.

An entry message indicates the transition of an object ID from not being detected at a particular location to being detected at that particular location. An entry message is created by an upstream location processor and sent downstream. The processing of an entry message is shown in FIG. 7. This process is initiated by the receipt of an entry message 120. The location processor receiving the entry message checks if it is currently tracking this object ID 121. If the object ID is currently being tracked, the location processor checks if the top entry in the stack for this object ID already shows the same location as the entry message 122. If the top entry of the stack already contains this object ID and receiver pair then there is no change in the object's location and no further processing is required. If its cache does not contain this object ID or it shows a different location then there has been a location change for this object. The location processor adds the object ID and receiver pair to the top of the stack for the object ID in its cache 124, time stamps the message 126, and sends an entry message to the next downstream location processor 128.

Figure 8:
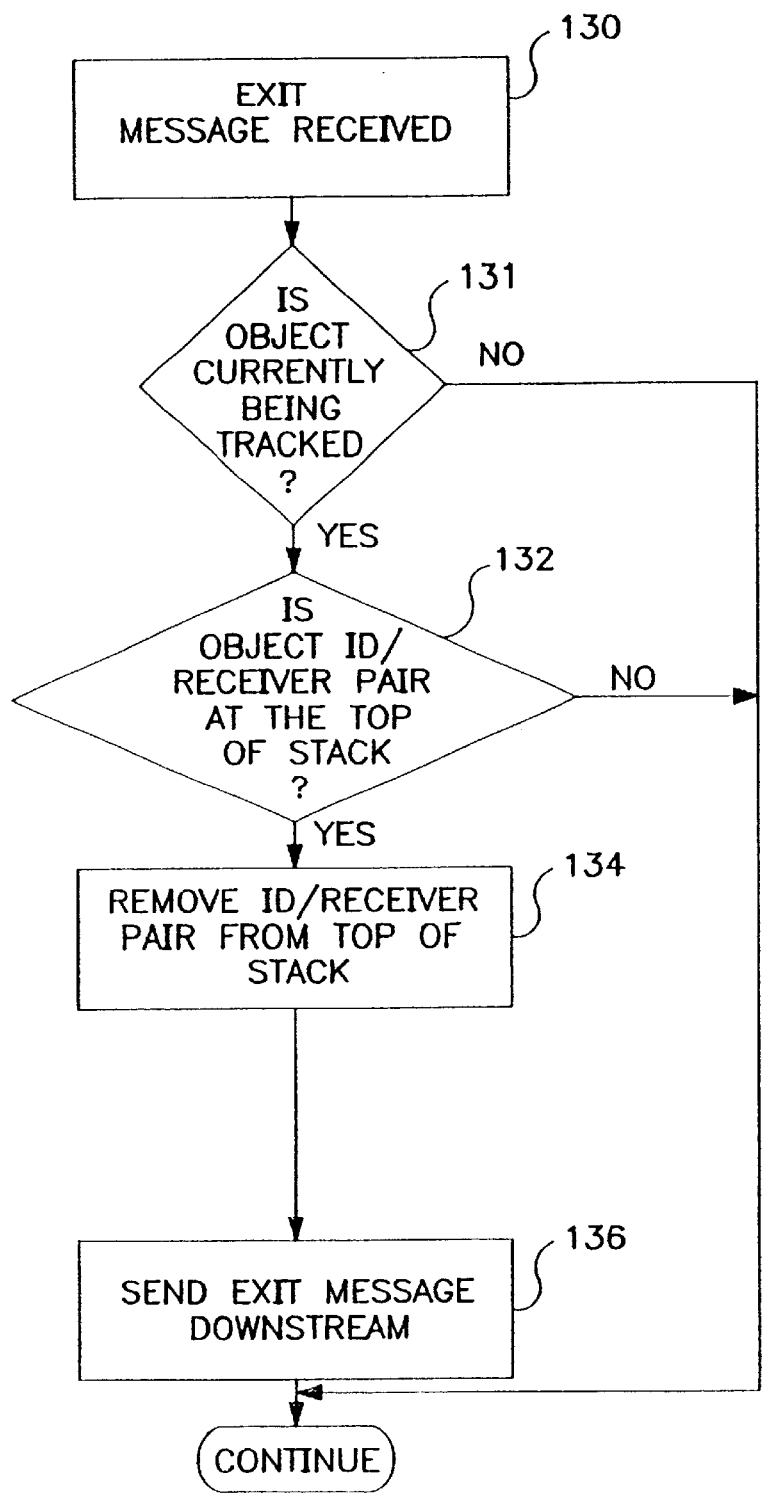
FIG. 8 shows the procedure used by a location processor for processing an exit message.

An exit message indicates the transition of an object ID from being detected at a particular location to not being detected at that particular location. An exit message is created by an upstream location processor and sent downstream. The processing of an exit message is shown in FIG. 8. This process is initiated by the receipt of an exit message 130. The location processor receiving the exit message checks if it is currently tracking this object ID 131. If the object ID is currently being tracked, the location processor checks if the top entry in the stack for this object ID already shows the same location as the presence message 112. If top entry does not contain this object ID and receiver pair then the object ID is not associated with the location and no further processing is required. If the top entry of the stack contains this object ID and receiver pair then the object ID and receiver pair is removed from the cache 134 and the exit message is sent to the next downstream location processor 136.

Buffered location processors can maintain up to two timers related to exit processing. The first, an exit timer is kept at the most upstream buffered location processor which could be a node 18 receiving object ID transmissions from a personnel badge 50 or asset tag 52, or a downstream location processor receiving presence messages from an upstream pass-through location processor. The exit timer is used to generate an exit message if presence messages are not received for a particular object over a predetermined time interval.

Figure 9:
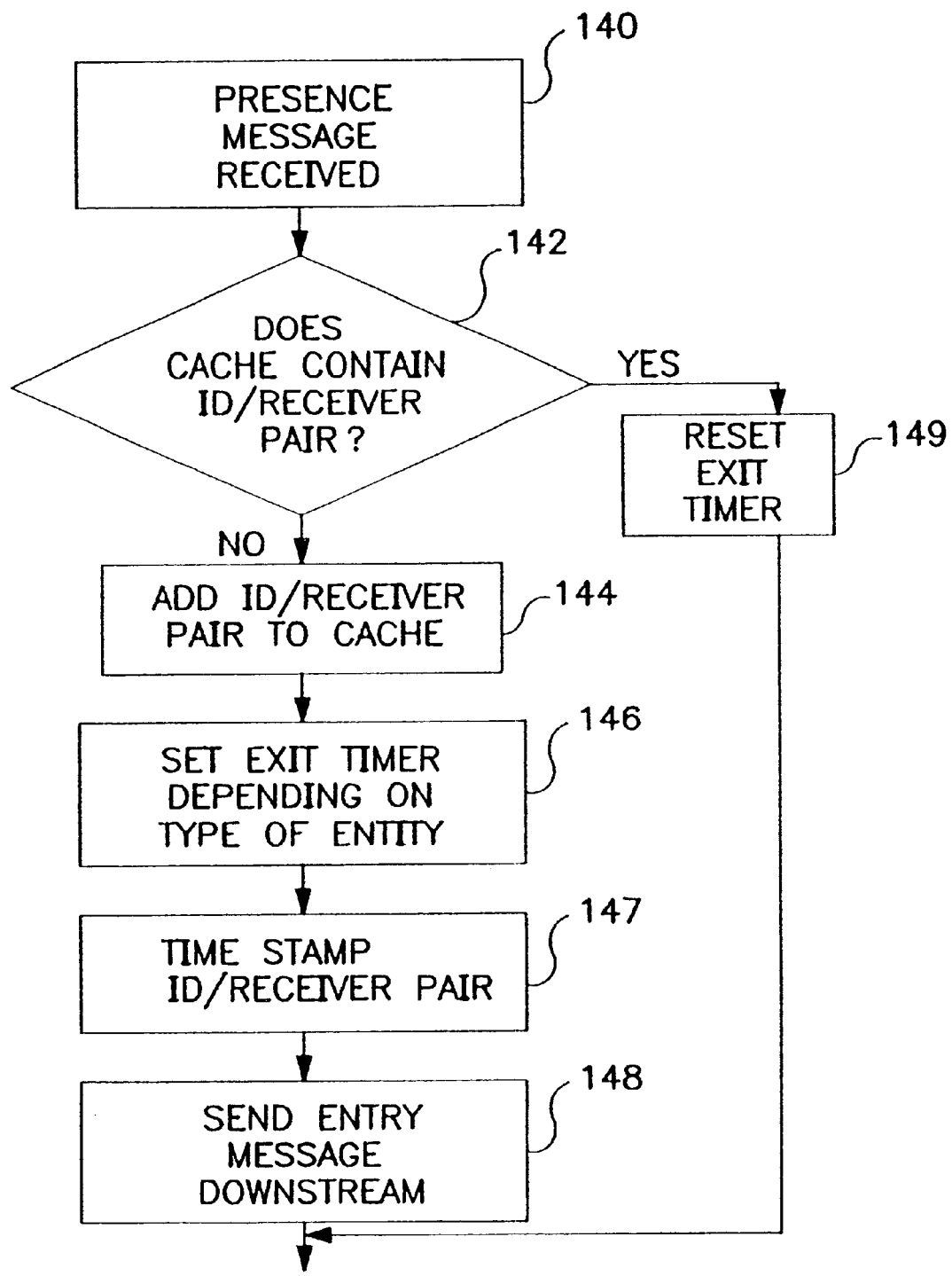
FIG. 9 shows the procedure used by a location processor for processing a presence message when the location processor has exit timer capability.

The initialization of an exit timer for a particular object ID is shown in FIG. 9. The process is initiated by the receipt of a presence message 140. The location processor receiving the presence message checks if its cache already contains this object ID and receiver pair 142. If its cache already contains this object ID and receiver pair then the exit timer is reset 149 and no further processing is required. If the cache does not contain this object ID and receiver pair then an entry condition has taken place for this object. The location processor adds the object ID and receiver pair to its cache 144, sets the exit timer for this object depending on whether it is an personnel badge 50 or asset tag 52 transmission 146, time stamps the object ID and receiver pair 147, and sends an entry message to the next downstream location processor 148.

Figure 10:
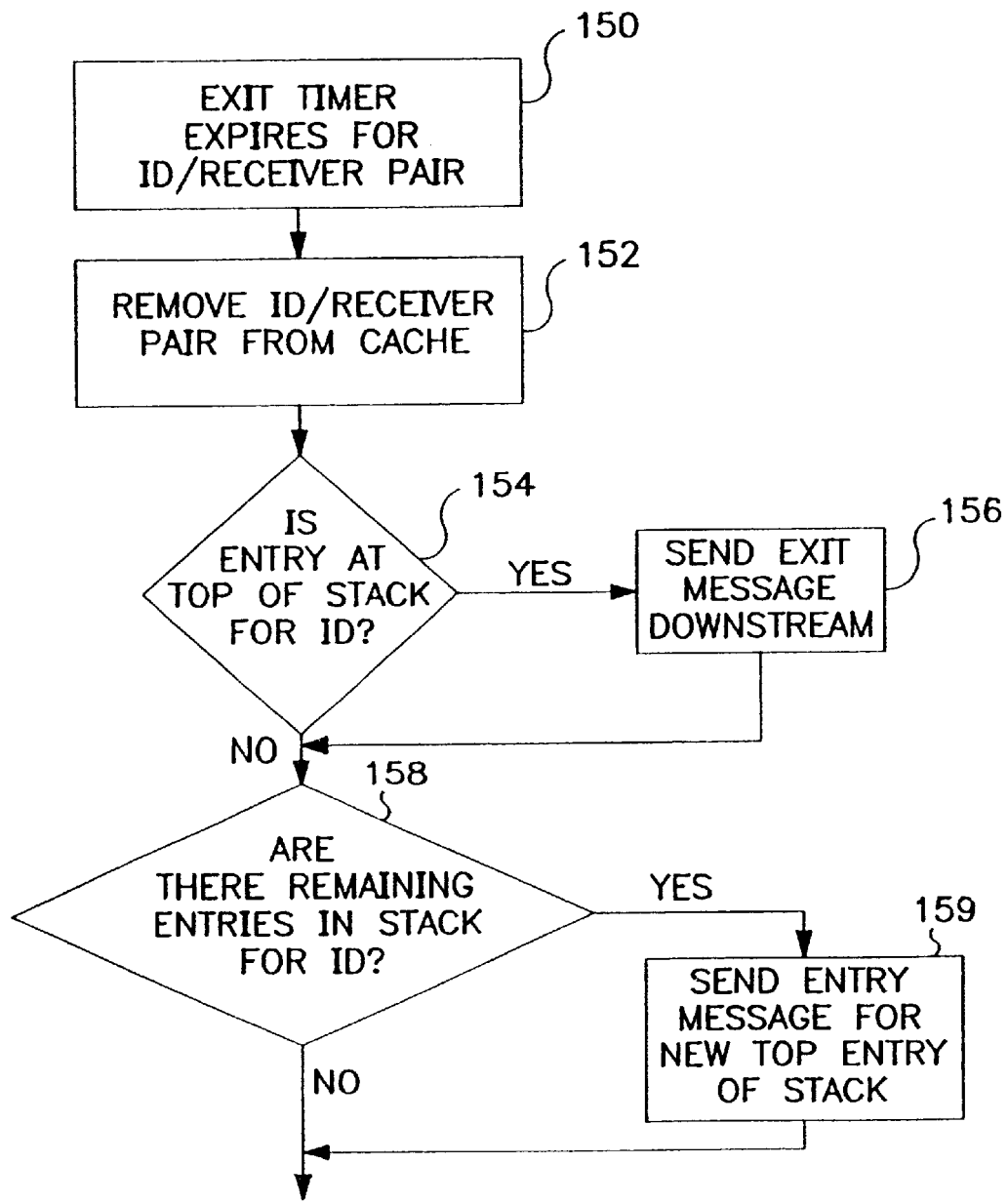
FIG. 10 shows the procedure used by a location processor when an exit timer expires.

The process that occurs when the exit timer expires for a particular object ID and location pair is shown in FIG. 10. This process is initiated by the expiration of the exit timer 150 which indicates that no presence messages have been received by the location processor since the exit timer was last set, and therefore the object is assumed to have left the location it was last associated with by this location processor. When the exit timer expires the object ID and receiver pair is removed from the cache 152. The location processor then checks if the object ID/location pair associated with this exit timer is at the top of its cache 154. If this pair is at the top of the stack an exit message is sent downstream 156. The location processor then checks if there are remaining entries in the stack for this object ID 158. If there are remaining entries, an entry message is sent downstream for the new location at the top of the cache for this object ID 159.

Figure 11:
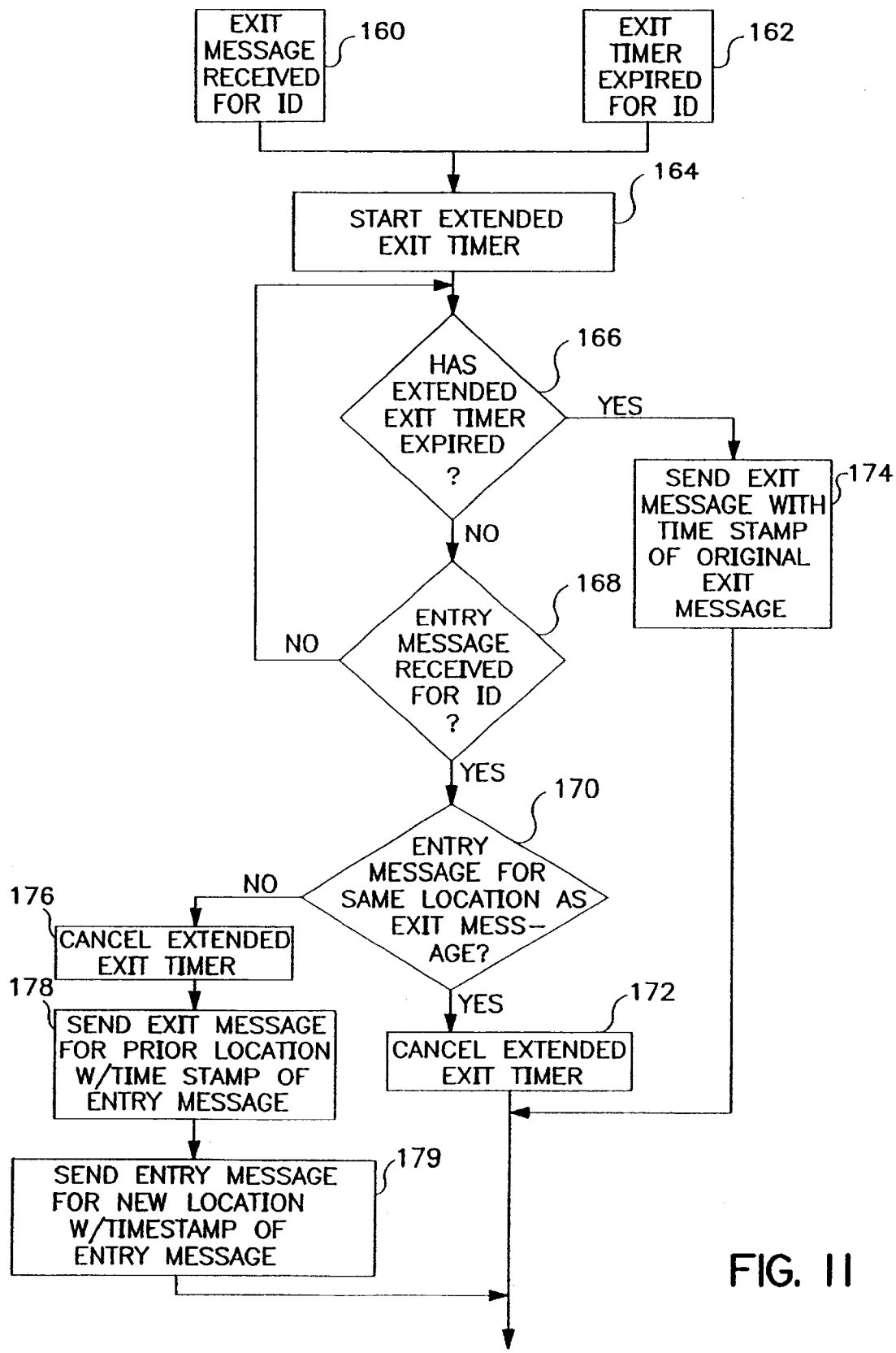
FIG. 11 shows the procedure used by a location processor for processing an exit message or the expiration of an exit timer when the location processor has an extended exit timer.

The second timer associated with exit message processing is an extended exit timer. An extended exit timer further delays the sending of an exit message downstream as shown in FIG. 11. Extended exit timer processing is initiated by the receipt of an exit message 160 or the expiration of an exit timer 162, either of which starts the extended exit timer 164 if the location processor is equipped for this processing. The location processor will then check for the expiration of the extended exit timer 166. If the extended exit timer expires before the receipt of an entry message for the particular object ID then an exit message is sent downstream with the time stamp of the original exit message 174 and no further processing is required. If an entry message is received for the particular object ID before the extended exit timer expires 168 then the location processor checks if the location of the entry message is the same as the object ID/location pair associated with the extended exit timer 170. If the location is the same then the object has not changed location and the extended exit timer is canceled 172 and no further processing is required. If the location is different then the object has changed location; the extended exit timer is canceled 176, an exit message is sent for the location associated with the extended exit timer with the time stamp of the entry message 178, and an entry message is sent for the new location with the time stamp of the entry message 179.

A downstream location processor can request an upstream location processor to send the contents of its cache showing the object IDs that the upstream location processor is tracking. The response message consists of a list of object IDs and their associated locations.

Action Message Processing

Each personnel badge 50 is equipped with an action button or switch which is used to send an alert signal. A unique system response can be defined for the reception of an alert signal from each personnel badge 50 tracked by the system. The primary response is maintained at the central server 10, and for an independent monitoring system 25 a secondary response can be maintained at the master station 24. The secondary response is initiated if either communication is lost between the central server 10 and the master station 24 or if no primary response has been programmed at the central server 10.

The object IDs of all personnel badges 50 and asset tags 52 have a zero for the most significant bit. When the action button or switch is triggered then the most significant bit is set to "1" which constitutes an alert signal. When a location processor receives an alert signal it makes an audible or visual response if equipped with a means for audible or visual response.

A sub-awareness area monitoring system passes the alert signal to the central server 10. The central server 10 records the time that the alert signal was sent and looks up the programmed response for the particular object ID. The programmed response can include instructions to send a notification message to one or more monitoring clients 40, or to direct an audio message to the audio annunciator of one or more nodes 18, or to send a message to a pocket pager. The central server 10 sends notification messages to all monitoring clients 40, nodes 18 and pocket pagers as instructed by the pre-programmed response. Each monitoring client 40 that receives the notification message sounds an audible tone indicating that a notification message has been received and a pop-up window is displayed on the monitoring client 40 indicating the personnel badge 50 that has sent the alert signal and the location from where the alert signal was sent. The person at the monitoring client 40 acknowledges the alert signal by closing the pop-up window, which sends an alert acknowledgment message back to the central server 10 which records the alert acknowledgment time. An independent monitoring system 25 may also have a secondary response stored on the master station which is initiated in addition to the central station 10 response. When the secondary alert process has been acknowledged the master station 24 sends an alert acknowledgment message back to the central server 10 which records the alert acknowledgment time.

Central Server and Client Communication

Figure 12:
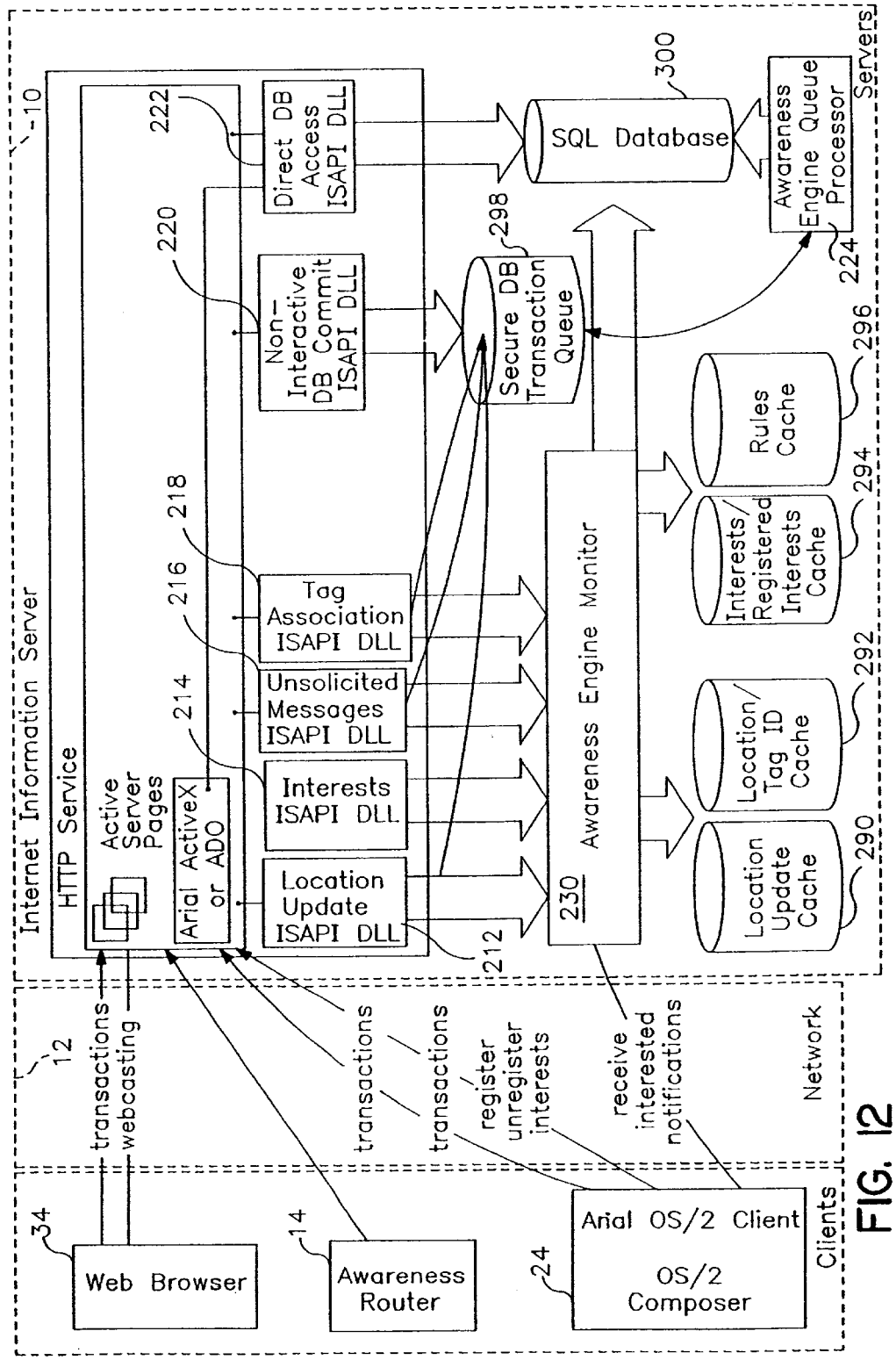
FIG. 12 shows a block diagram of the central server web browser interface and the associated application programs and databases on the central server with connection to clients.

A top-level diagram of the communications between the central server 10 and potential clients 14, 24, 34 over the network 12 is shown in FIG. 12. There are three types of clients that are in contact with the central server 10. The first is a dependent monitoring system router 14. The router 14 is in communication with the central server 10 sending location messages for the sub-awareness area that the dependent monitoring system 15 is monitoring. The second type of client is an independent monitoring system master station 24. The master station 24 is in two-way communication with the central server 10 sending location messages for the sub-awareness area that the independent monitoring system 25 is monitoring, and primarily receiving location updates for personnel badges 50 assigned to the independent monitoring system 25 which are received from outside the sub-awareness area that the independent monitoring system 25 is monitoring. The third type of client is a network client 40. Network clients 40 primarily query the central server 10 for location and tracking data to create screen displays or reports, they do not provide location updates but they can update other data on the central server 10.

The interface between the central server 10 and the network client 40 is a Web browser interface commonly used on the Internet. The interface between the central server 10 and the dependent monitoring system router 14 or the independent monitoring system master station 24 can be web browser based or through other network communication methods. The web server 210 is developed with Internet Information Server (IIS) software, developed by Microsoft, on the central server 10 provides the necessary functionality to host a Web site that can intercept and interpret information requests or updates, call the service providers to make the necessary database queries or updates, and create a a dynamic Web page responsive to the information request or update. The web server 210 can service multiple clients over an Internet or Intranet from a single central server 10. The service providers for the web server 210 are applications that can update, query and maintain databases containing information of interest to the clients.

The primary location and tracking databases on the central server 10 are as follows. The Location Update Cache 290 contains the current location of all personnel badges 50 and asset tags 52, ordered by location. The Location/Tag ID Cache 292 contains the current location of all personnel badges 50 and asset tags 52, ordered by Tag ID. Having the current location of all personnel badges 50 and asset tags 52 ordered by both location and Tag ID allows increased system performance when responding to database queries. The Rules Cache 296 contains rules defined for objects and locations such that when a rule is violated a message is sent to interested client 24, 34. The Registered Interests Cache 294 contains a cross-reference between clients 24, 34 and interests for which the client 24, 34 is registered. The Database Transaction Queue 298 contains all of the incoming and processed transactions from networked clients. The SQL Database 300 contains a record of all database change events that have occurred and their times.

The Location Update application 212 receives location updates from dependent monitoring systems 15 and independent monitoring systems 25. The location updates can be in the form of entry messages or exit messages if the monitoring system is buffered or in the form of presence messages if the monitoring system is pass-through. The Location Update application 212 updates the object ID/location pair in both the Location Update Cache 290 and the Location/Tag ID Cache 292, and also enqueues the transaction in the Transaction Queue 298.

The Interests application 214 receives interests from clients that a user would like to add to or delete from the Registered Interests Cache 294. Interests are events that a client application wants to be notified of when the event occurs. Examples of interests are alarm events and personnel badge 50 assignment changes. The Interests application 214 records the event and client that wants to be notified of the event in the Interests Cache 294 and also enqueues the transaction in the Transaction Queue 298.

The Tag Association application 218 manages the association and disassociation of personnel badges 50 and asset tags 52 to people and assets, respectively. The Tag Association application 218 receives instructions from a client and makes the appropriate updates to the Location/Tag ID Cache 292 and enqueues the transaction to the Transaction Queue 298.

The Non-Interactive Database application 220 handles all database transactions that do not require a user response. The Direct Database Access application 222 handles all transactions that require access to the SQL Database 300.

Figure 13:
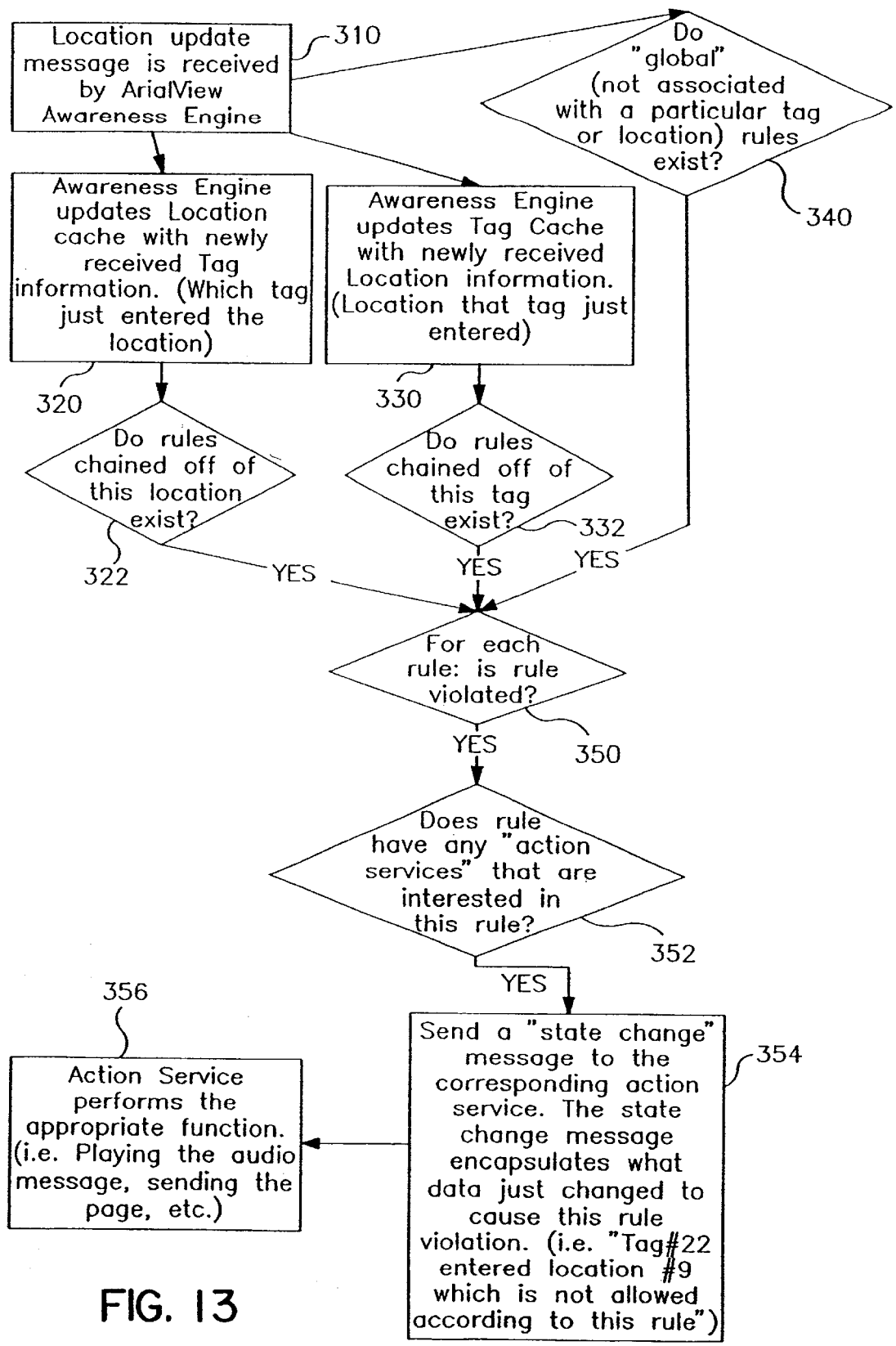
FIG. 13 is a flowchart of the rules processing by the Awareness Engine Monitor when a location update message is received.

The Awareness Engine Monitor 230 constantly watches the caches for the occurrence of alarm and interest events stored in the Interests Cache 294 or violations of the rules stored in the Rules Cache 296. When an interest event occurs or a rule has been violated the Awareness Engine Monitor 230 sends an appropriate notification to the clients that have registered for that event. A flowchart of the rules processing performed by the Awareness Engine Monitor 230 is shown in FIG. 13. The process is initiated by the receipt of a location message by the web server 210 of the central server 10, as shown in step 310. When the location update is passed to the Awareness Engine Monitor 230, the following processes are performed. First, the location entry is updated in the Location/Tag ID Cache 292 to indicate a new object ID at this location, as shown in step 320. The Awareness Engine Monitor 230 then checks if any rules concern this location 322. Second, the object ID entry in the Location Update Cache 290 is updated to indicate that the object ID is located at the new location, as shown in step 330. The Awareness Engine Monitor 230 then checks if any rules concern this object ID 332. Third, the Awareness Engine Monitor 230 checks if there are any global rules, those that do not concern a particular object or location ID, triggered by this update 340. The Awareness Engine Monitor 230 then checks whether any of the rules found in steps 322, 332 and 340 are violated, as shown in step 350. If any rule was violated the Awareness Engine Monitor 230 checks if the Registered Interests Cache 294 has a client to be notified of the rule violation 352. A message is sent by the central server to any registered client indicating the rule violation that occurred 354. The client can then perform the response it is programmed to perform when the notification is received 356.

The Subscription Service application 216 is also used for event notification and alarms. The Subscription Service application 216 sends the notification message to the client that has subscribed to be notified of a particular event. An example is an independent monitoring systems 25 that wants to be informed when a personnel badge 50 assigned to the sub-awareness area being monitored by the independent monitoring system 25 is detected outside of that particular sub-awareness area. In this instance, the Subscription Service application 216 will be initiated when an assigned badge 50 of the independent monitoring system 25 is detected outside its sub-awareness area and the Subscription Service application 216 will send a location message to the independent monitoring system 25 to be used to update the local sub-awareness area database being maintained by the master station 24.

The Awareness Engine Queue Processor 224 processes all transactions in the enqueue of the Transaction Queue 298 to update the SQL Database 300. When a request is received by the Web Server 210 it is handed off to the appropriate service provider application. If the request involves a database update, the appropriate update information is placed in Transaction Queue 298. Once a transaction is successfully processed by the Awareness Engine Queue Processor 224 it is moved to the dequeue of the Transaction Queue 298. If a transaction is not successfully processed by the Awareness Engine Queue Processor 224 it is moved to a separate part of the dequeue for failed transactions. From here an Administrative Client 44 can review the transaction, make any necessary changes and requeue the transaction for processing by the Awareness Engine Queue Processor 224. An Administrative Client 44 also periodically cleans up dequeued transactions.

The data flow from the tag transmission to the appropriate database updates at the central server 10 is as follows. A personnel badge 50 or asset tag 52 transmission is detected by a receiver node 18 and the receiver node 18 generates a location message which it sends downstream. If the receiver node 18 is part of a dependent monitoring system 15 the location message is sent to the router 14 which sends the location message across the network 12 to the central server 10 without any intermediate storage. If the receiver is part of an independent monitoring system 25 it is stored at the master station 24 and the master station 24 also sends the location message across the network 12 to the central server 10. The web browser 210 on the central server 10 receives the location message. The web browser 210 passes the location message to the Location Update program which updates the Location Update cache 290 and the Location/Tag ID Cache 294 and checks the Rules Cache 296 for any actions that are to be performed based upon the update. A transaction is also sent to the Transaction Queue 298 which will be processed by the Transaction Queue Processor 224 to make a historical record of the update on the SQL Database 300.

Client Interfaces

The master station 24 of an independent monitoring system 25 can be a client of the central server 10. The nodes 18 of the independent monitoring system 25 receive transmissions from personnel badges 50 and asset tags 52 in the sub-awareness area covered by the independent monitoring system 25. These transmissions are converted into location messages which are forwarded to the master station 24 which updates the local sub-awareness area database and transmits the location update to the web browser 210 on the central server 10 which collaborates with the appropriate programs to update the Location Update cache 290, the Location/Tag ID Cache 292 and the SQL Database 300.

The independent monitoring system 25 has several important advantages due to its connection to the central server 10. The first advantage is that the independent monitoring system 25 can track the personnel badges 50 and asset tags 52 assigned to the independent monitoring system 25 even when they are outside of the sub-awareness area monitored by the independent monitoring system 25, as long as they are within the awareness area. All of the objects that an independent monitoring system 25 wants assigned are listed in the Interests Database 294 with the identity of the independent monitoring system to be notified. When an object is within the awareness area but outside the independent monitoring system's 25 sub-awareness area, the central server 10 will receive a location message for the object from another client. When this location message is detected by the Awareness Engine Monitor 230 it will recognize the interest in the Interest Database 294 and send a location message for the object to the independent monitoring system 25 using the Subscription Service application 216.

This same functionality can be used by an independent monitoring system 25 to add objects that it wants to track in its local sub-awareness area database. A message would be sent from the master station 24 of the independent monitoring system 25 to the Web Server 210 of the central server 10 to register an interest for the new object. The Interests application 214 would record the interest in the Interests Database 294 and the Awareness Engine Monitor 230 would inform the independent monitoring system 25 of any location messages received for the associated object badge/tag outside the independent monitoring system's 25 sub-awareness area.

The connection to the central server 10 also allows the independent monitoring system 25 to resolve the identity of personnel badges 50 and asset tags 52 which are not assigned to the sub-awareness area when they are detected within the sub-awareness area. The master station 24 of the independent monitoring system 25 will send a location message for an object not assigned to its sub-awareness area and also store the location message in a visitor cache. If the master station 24 does not know the identity of the object associated with the location message it will send a query to the Internet Information Server 210 of the central server 10. The Direct Database Access program 222 in the central server 10 will query the SQL Database 300 and send a response containing the identity of the object for use in the local sub-awareness area database of the independent monitoring system 25.

Connection to the central server 10 also allows a user at the master station 24 of the independent monitoring system 25 to perform location searches for any locateable entity in the awareness area known to the central server 10 or other functions that can be performed from a client 40.

A client 40 is used to access information maintained by the central server 10. A client 40 has a web browser interface through which a user communicates with the Web Server 210 of the central server 10 to query or update information maintained in the central server 10 databases. The two primary location viewing applications of the client 40 are the Personnel View and Asset View functions. The client 40 can be a computer assigned to an individual that contains the Personnel View and Asset View software packages and has access to the central server 10 via an Internet or Intranet connection.

Personnel View allows a user to locate personnel associated with personnel badges 50, to assign and deassign personnel to personnel badges for tracking in the awareness area, to maintain and update personnel information stored by the central server 10, and to perform administrative functions. When a user wishes to use the Personnel View function they must first login to the system to indicate the user's identity and to prevent unauthorized access.

A personnel search can be performed from a standard search screen or the user can set-up a list of common searches they wish to perform and simply select one of these pre-defined searches. Personnel searches can be run based on first name, last name, department, skill and location with filter options of begins with, contains, or equals. Fields maintained in the Personnel Database on the central server 10 include name, department, skill, time since badge last seen, location where badge last seen, nearest phone number to location where badge last seen, name and phone number of person taking calls for this person, and mobile phone number for person. When the information is displayed for the located person or persons several fields may be highlighted showing a link to additional information about the hyperlinked item. For instance, location, department, organization or skill fields could be highlighted to indicate that an explanation of the contents or codes used for each of these fields is available which the user can access by selecting the highlighted field. An edit option is also available to the user to edit any information stored in the personnel databases on the central server 10 for the user login entered or for those personnel that have authorized updates by the user login entered.

A user can also log onto Personnel View and enter status information. An out to lunch or gone home option will set the location of the badge associated with the logged on user to "Out to Lunch" or "Gone Home" respectively and provide an expected return time. The expected return time can be either a default time or default length of time from when the message was activated or can be over-ridden by a time entered by the user. A search that includes that user will return the location message and expected return time until the expected return time is passed. After the expected return time passes the normal location message will be returned for the user. A do not disturb option, if selected by the user, will display "Do Not Disturb" along with the location information for any search performed that returns the user's location. This message will continue to be displayed until disabled by the user.

Asset View allows a user to locate assets associated with an asset tag 52, to assign and deassign assets to asset tags for tracking in the awareness area. When a user wishes to use the Asset View function they must first login to the system to indicate the user's identity and to prevent unauthorized access.

An asset search can be performed from a standard search screen or the user can set-up a list of common asset searches they wish to perform and simply select one of these pre-defined searches. Asset searches can be run based on standard asset description, add-on description, asset ID, asset category, location, or vendor with filter options of begins with, contains, or equals. Fields maintained in the Asset Database on the central server 10 include asset name, asset serial number, time since tag last seen, location where tag last seen, asset owner's name and phone number. When the information is displayed for the located asset several fields may be highlighted showing a link to additional information about the hyperlinked item.

A client 40 can also be equipped to support report generation and report design. The report design function is internal to the client 40 and allows the user to customize the content of a report and the arrangement of data fields. The report generator allows the user to select a predefined report which was designed with the report designer. When the user runs the report the report generator uses a web browser interface to communicate over a network connection to the web browser 210 of the central server 10. The necessary data from the central server databases is retrieved and sent back to the client 40. The report client formats the returned data according to the report design. The user can then display, print or save the report.

It will be understood that various modifications can be made to the system disclosed in this application without changing the scope of the invention as set forth in the claims attached hereto.

What is claimed is:

1. A system for locating and tracking tags, the system comprising:
   a first monitoring means adaptable to monitor tags in a first sub-awareness area,
   a second monitoring means adaptable to monitor tags in a second sub-awareness area, and
   means for notifying the first monitoring means of detection in the second sub-awareness area of a tag assigned to the first sub-awareness area.

2. In a system for locating and tracking tags, a monitor comprising:
   means for monitoring tags in a first sub-awareness area, and
   means for receiving notification from a means for monitoring tags in a second sub-awareness area of detection in the second sub-awareness area of a tag assigned to the first sub-awareness area.

3. A locating and tracking system comprising:
   a first monitor configured to monitor tags located in an awareness area,
   a second monitor configured to detect a tag at a location outside the awareness area, and
   a server configured to receive location messages from the first and second monitors and notify the first monitor if a tag is detected outside the awareness area.

4. The system of claim 3, wherein the server provides location updates to the first monitor.

5. The system of claim 3, wherein the location messages identify a tag and a location of the tag.

6. The system of claim 3, wherein the location messages identify a status of a tag.

7. The system of claim 3, wherein the location messages identify a time that a tag is at a location.

8. The system of claim 3, wherein the first monitor includes a memory.

9. The system of claim 8, wherein the memory is configured to store tag location information.

10. The system of claim 8, wherein the memory is configured to store tag status information.

11. The system of claim 8, wherein the memory is configured to store information relating to a time that a tag is at a location.

12. The system of claim 3, wherein the first monitor is an independent monitoring system.

13. The system of claim 12, wherein the second monitor is a dependent monitoring system.

14. The system of claim 12, wherein the second monitor is a second independent monitoring system.

15. In a locating and tracking system, a computer program operable to cause a computer to:
   receive a first location message from a first monitoring system,
   receive a second location message from a second monitoring system,
   process the first and second location messages to determine whether a tag has moved to a new location, and
   notify the first monitoring system if a second location message related to a tag assigned to the first monitoring system is received.

16. The system of claim 15, wherein the computer program is also operable to notify the first monitoring system if a tag assigned to the first monitoring system is detected by a second monitoring system.

17. In a locating and tracking system, a computer program operable to cause a first computer which is monitoring an area to:
   receive a transmission from a tag,
   determine whether the tag has moved from a first location to a second location, and
   send a location message to a second computer which is not monitoring the area if the tag has moved from the first location to the second location.

18. The system of claim 17, wherein the first computer is an independent monitoring system to which the tag is assigned.

19. The system of claim 17, wherein the second computer is a client used by an individual to access locating and tracking information.

20. The system of claim 17, wherein the location message indicates that the tag has entered a particular location.

21. The system of claim 17, wherein the location message indicates that the tag has exited a particular location.

22. In a locating and tracking system, a method for processing location messages, the method comprising the steps of:
   receiving a location message for a tag located in an area,
   determining whether the tag is at a new location, and
   providing a location update to a networked computer if the tag is at a new location to permit the location update to be accessed by a system that is not monitoring the area.

23. The method of claim 22, wherein the system includes a central server.

24. The method of claim 22, wherein the system includes a master station.

25. The method of claim 22, wherein the system includes a client configured to permit a user to access locating and tracking information via the networked computer.

26. The method of claim 25, wherein the client includes an interface to allow a user to perform location searches.

27. The method of claim 26, wherein the in surface allows the user to identify one of an object and person associated with the tag.

28. The method of claim 25, wherein the locating and tracking information includes a previous location of the tag.

29. The method of claim 22, wherein the location update includes a status of the tag.

30. The method of claim 22, wherein the location update includes a time at which the tag is at a location.

31. The method of claim 22, wherein the tag is assigned to a person.

32. The method of claim 22, wherein the tag is assigned to an asset.

33. The method of claim 22, wherein the location update indicates that the tag has entered a particular location.

34. The method of claim 22, wherein the location update indicates that the tag has exited a particular location.

35. A locating and tracking system comprising:
   a server connected to a network,
   a first monitoring system in two-way communication with the server, and
   a second monitoring system in one-way communication with the server.

* * * * *